(12) United States Patent  
Gutierrez (10) Patent No.: US 7,693,207 B2  
(45) Date of Patent: Apr. 6, 2010

(54) PRE-IONIZER FOR PULSED GAS-DISCHARGE LASER

(75) Inventor: Raul Martin Wong Gutierrez, Windsor Locks, CT (US)

(73) Assignee: Coherent, Inc., Santa Clara, CA (US)

( * ) Notice: Subject to any disclaimer, the term of this patent is extended or adjusted under 35 U.S.C. 154(b) by 92 days.

(21) Appl. No.: 11/900,530

(22) Filed: Sep. 12, 2007

(65) Prior Publication Data

US 2009/0067467 A1    Mar. 12, 2009

(51) Int. Cl.  
*H01S 3/22*    (2006.01)

(52) U.S. Cl. .......................................... 372/55; 372/57
(58) Field of Classification Search .............. 372/55–60
See application file for complete search history.

(56) References Cited

U.S. PATENT DOCUMENTS

| | | | | |
|---|---|---|---|---|
| 3,800,244 | A * | 3/1974 | Karras ...................... | 313/161 |
| 5,123,028 | A | 6/1992 | Hobart et al. ............... | 372/95 |
| 5,313,487 | A | 5/1994 | Fujikawa et al. ........... | 372/86 |
| 5,434,881 | A | 7/1995 | Welsch et al. .............. | 372/87 |
| 6,522,679 | B1 * | 2/2003 | Strowitzki et al. ......... | 372/87 |
| 6,963,596 | B2 | 11/2005 | Shackleton et al. ........ | 372/86 |
| 7,453,918 | B2 * | 11/2008 | Laughman et al. ......... | 372/55 |
| 2005/0163183 | A1 * | 7/2005 | Shackleton et al. ........ | 372/55 |
| 2007/0297479 | A1 * | 12/2007 | Swinney ..................... | 372/58 |
| 2008/0069170 | A1 * | 3/2008 | Shackleton et al. ........ | 372/61 |

FOREIGN PATENT DOCUMENTS

| EP | 0 542 718 A1 | 10/1985 |
|---|---|---|
| GB | 2098791 A | 4/1982 |

* cited by examiner

*Primary Examiner*—Minsun Harvey  
*Assistant Examiner*—Delma R Forde  
(74) *Attorney, Agent, or Firm*—Morrison & Foerster LLP (57) ABSTRACT

In a $CO_2$ laser a pre-ionizer is assembled in a flange configured to be attached to a laser-gas enclosure of the laser over an aperture in a wall of the enclosure. An aperture in the base of the flange is aligned over the aperture in the enclosure wall. The aperture in the pre-ionizer flange is covered by a ceramic membrane. A disc electrode is in contact with the ceramic membrane on a side of the membrane outside of the laser-gas enclosure. An RF potential applied to the disc electrode creates a corona discharge on the side of the ceramic membrane inside the enclosure. The corona discharge ionizes laser gas in the enclosure before RF power is applied to electrodes of the slab laser. A cylindrical ceramic sleeve extends from the membrane for containing the discharge.

20 Claims, 7 Drawing Sheets

PRE-IONIZER FOR PULSED GAS-DISCHARGE LASER

TECHNICAL FIELD OF THE INVENTION

The present invention relates in general to pulsed gas-discharge lasers. The invention relates in particular to pre-ionizing devices for such lasers.

DISCUSSION OF BACKGROUND ART

A pulsed gas-discharge laser usually includes a sealed enclosure filled with a gas mixture (laser gas). A series of electric discharges is struck in the lasing gas in a discharge region between spaced-apart electrodes. This is accomplished by applying a repetitively pulsed electrical potential across the electrodes. A laser resonator is arranged with an axis thereof extending through discharge region. The discharge energizes the gas mixture and the energized gas mixture provides optical gain. Laser output is delivered from the resonator in a series of optical-radiation pulses having a repetition frequency corresponding to the repetition pulsed electrical potential.

A pulsed gas-discharge laser commonly used in industrial applications is a pulsed carbon-dioxide ($CO_2$) laser commonly referred to as a slab laser. In such a laser the spaced apart electrodes are elongated electrodes ("slab" electrodes), usually having a plane face of one arranged face-to-face and parallel to a corresponding plane face of the other. In such a $CO_2$ laser, the lasing gas pressure is usually between about 50 Torr and 150 Torr. The pulsed electrical potential is applied as a pulsed radio frequency (RF) potential. The RF potential (power) during each pulse ignites and sustains the gas discharge. It is usual to provide a pre-ionizing device to create ionization in the lasing gas before the pulsed RF-power is applied.

In the absence of such a pre-ionizing device, the time required to ignite the discharge between the slab electrodes and obtain pulsed laser output can vary randomly. Such a random ignition time would be undesirable for applications requiring precise laser turn-on and turn-off time, such as in drilling, marking, engraving, scribing, and cutting. In addition, in order to ignite the discharge without a pre-ionizer, it would usually be necessary to increase the RF power to a level two or more times greater than the power necessary to sustain the discharge once it has been ignited. This adds complexity and cost to the RF power supply.

One prior-art approach to providing pre-ionization in a pulsed $CO_2$ laser is described in U.S. Pat. No. 5,434,881. In this approach, the pre-ionization is provided by repeatedly striking a spark discharge between two auxiliary spaced-apart electrodes located in the vicinity of the discharge region. It has been found, however, that these auxiliary electrodes are rapidly eroded by the repetitive sparking, and that the eroded (sputtered) material of the electrodes can contaminate the lasing gas and shorten the lifetime of the laser.

One device designed to overcome the sputtering and contamination problems of the approach of the '881 patent is described in U.S. Pat. No. 6,963,596, to Shackleton et al., assigned to the assignee of the present invention and incorporated herein by reference. In this device, a pre-ionizing discharge is formed between two pin-like electrodes (pin-electrodes), each thereof covered by a dielectric jacket. The dielectric jacket for the pin electrodes is provided by a ceramic crucible having hollow extension portions protruding from a base of the crucible, and shaped to accommodate the pin-electrodes. The crucible is clamped into an aperture of the lasing gas enclosure, and a separate assembly including the pin-electrodes is clamped to the crucible. The dielectric-covered pin-electrodes are energized by a low-power RF power source.

The dielectric covering of the pin-electrodes of Shackleton et al. device essentially eliminates problems of sputtering and related contamination of the laser. However, parts for the device have been found to be difficult to fabricate, intricate to assemble and relatively fragile. There is a need for a simpler, more robust device that is equally effective at eliminating sputtering and contamination problems of prior art pre-ionization approaches.

SUMMARY OF THE INVENTION

In one aspect a pre-ionizer in accordance with the present invention for a gas-discharge laser, comprises a metal body attachable to the gas-discharge laser and having a passage extending therethrough. A membrane of a dielectric material is sealably retained within the metal body and closes the passage through the metal body. A planar electrode is retained within the metal body, in contact with the dielectric membrane on one side thereof and electrically isolated from the metal body. When the pre-ionizer is attached to the gas discharge laser via the metal body and an RF potential is applied to the planar electrode a gas discharge is formed on the side of the dielectric membrane opposite the electrode. A dielectric sleeve extending from the dielectric membrane on the disc thereof opposite the planar electrode is configured to prevent the gas discharge from contacting the metal body.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
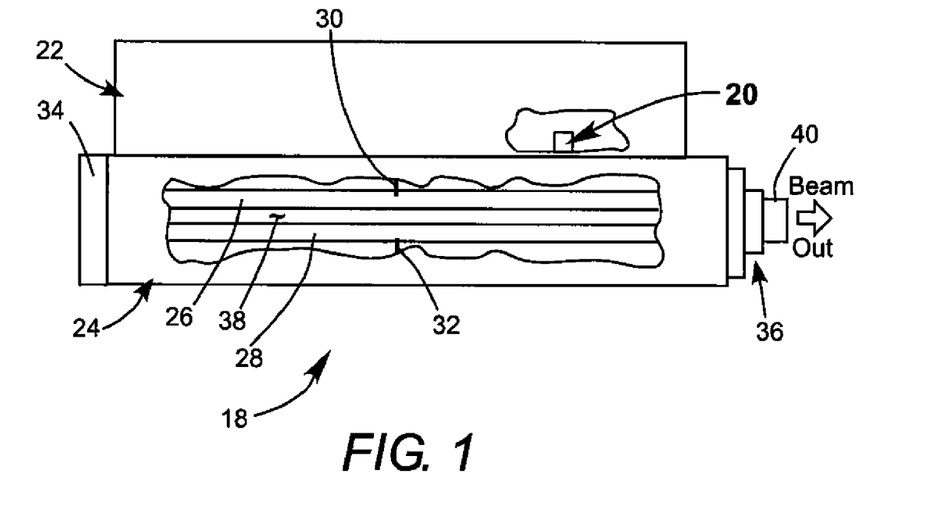
FIG. 1 is a cutaway side-elevation view schematically illustrating an RF energized slab laser having a laser enclosure at low pressure containing slab electrodes and a laser gas, the laser enclosure being surmounted by a power enclosure at atmospheric pressure, the power enclosure for housing an integrated RF power supply for the laser and also including components of a pre-ionizer in accordance with the present invention.
Figure 2:
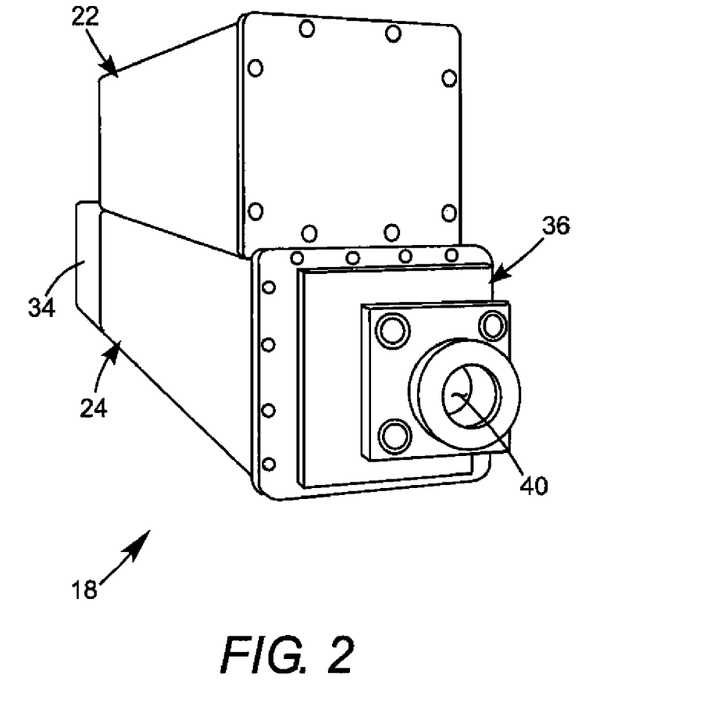
FIG. 2 is a perspective view schematically illustrating detail of a preferred arrangement of integrated laser and power enclosures in one example the laser of FIG. 1.

Referring now to the drawings, wherein like components are designated by like reference numerals, FIG. 1 and FIG. 2 schematically illustrate a slab laser 18 including a pre-ionizer 20 in accordance with the present invention. Laser 18 includes an upper enclosure 22 and a lower enclosure 24. Upper enclosure 22 is at atmospheric pressure and contains RF power supply circuitry (not shown) for powering the laser and the pre-ionizer. Enclosure 22 is referred to hereinafter as the power enclosure. Lower enclosure 24 is at a low (less than atmospheric) pressure, for example, between about 50.0 Torr and 150.0 Torr. Enclosure 24 contains lasing gas and components of the slab laser including slab electrodes 26 and 28. Slab electrode 26 receives radio frequency (RF) power from a supply thereof (not shown) in power enclosure 22 via an electrode 30. Slab electrode 28 is connected to ground by an electrode 32. Mirrors (not explicitly shown) for forming a laser resonator are held at opposite ends of the laser enclosure in mirror mounts 34 and 36. The laser resonator extends through a gap 38 between slab electrodes 26 and 28. A discharge is formed in the gap when sufficient RF power is applied to electrodes 26 and 28. An output beam of the laser exits enclosure 24 via a window 40 laterally offset in mirror mount 36.

It should be noted here that only sufficient description of laser 18 is provided herein to indicate how preferred embodiments of the inventive pre-ionizer may be integrated into this and other slab lasers. A detailed description of the construction and operation of RF-energized slab lasers in general is provided in U.S. Pat. No. 5,123,028, the complete disclosure of which is hereby incorporated by reference.

Figure 3:
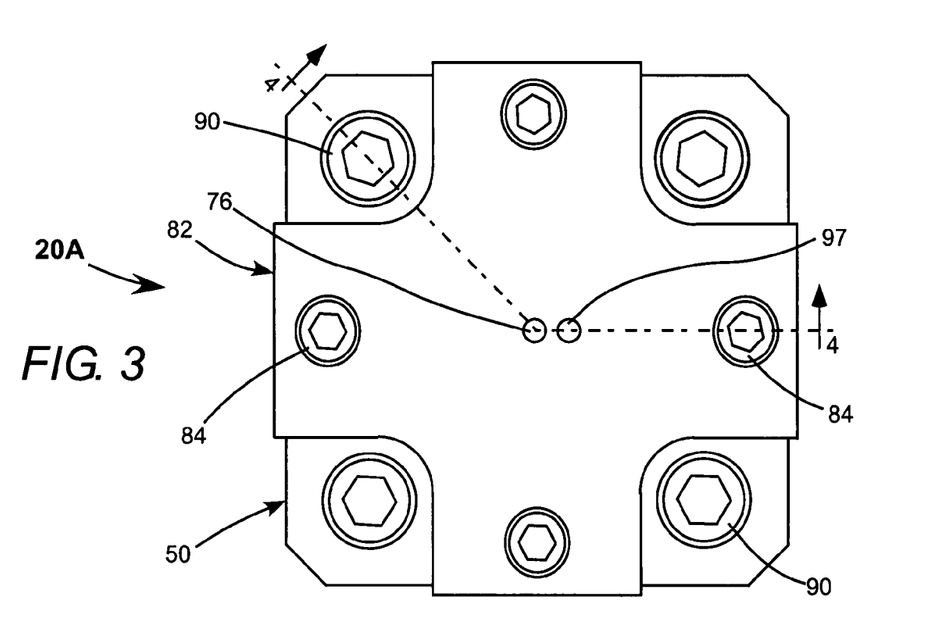
FIG. 3 is a plan view from above schematically illustrating one preferred embodiment of a pre-ionizer in accordance with the present invention.
Figure 4:
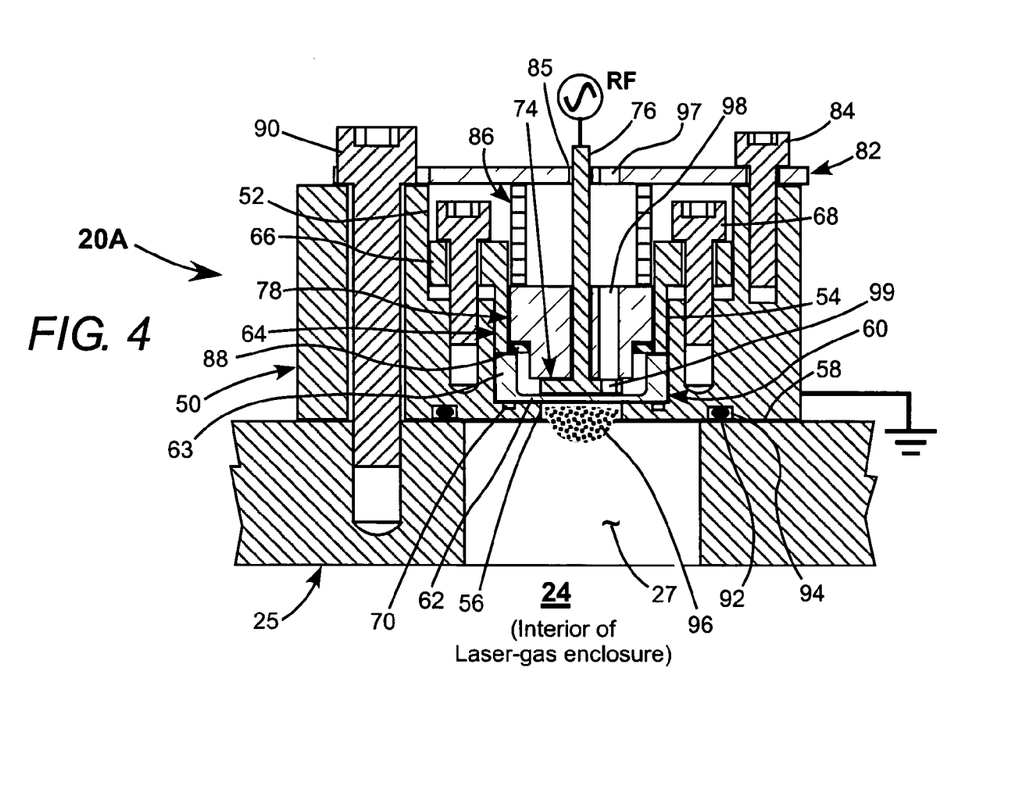
FIG. 4 is a fragmentary cross-section view seen generally in the direction 4-4 of FIG. 3, schematically illustrating details of the pre-ionizer of FIG. 3, the pre-ionizer including a mounting flange for mounting the pre-ionizer over an aperture in a wall of the laser enclosure of FIG. 1, the mounting flange having an aperture therein aligned with the enclosure-wall aperture, the aperture of the mounting flange being covered by a dielectric membrane provided by the base of a dielectric crucible, the crucible being clamped and sealed within the flange, and the pre-ionizer having a disc electrode adjacent the dielectric membrane on a side thereof opposite the flange aperture.
Figure 5:
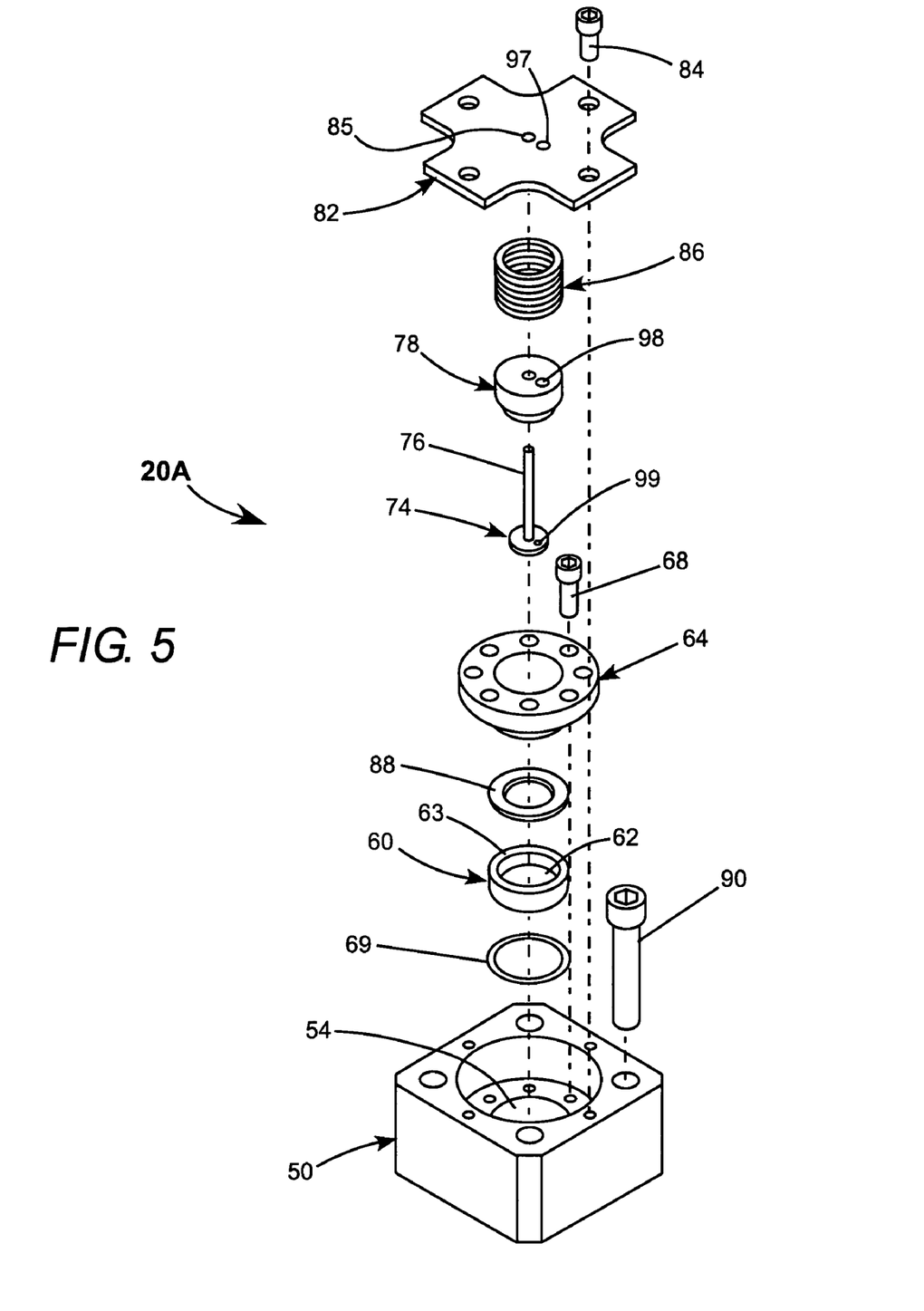
FIG. 5 is an exploded three-dimensional view schematically illustrating further details of components and assembly thereof in the pre-ionizer of FIGS. 3 and 4.

FIG. 3, FIG. 4, and FIG. 5 schematically illustrate a preferred embodiment 20A of pre-ionizer 20 mounted on a metal wall 25 of enclosure 24 of FIG. 1. Pre-ionizer 20A is assembled in a metal body 50 that serves as a mounting-flange for attaching the pre-ionizer to enclosure 24 and is referred to as a flange hereinafter. Flange 50 has an upper circular recess 52 and a lower circular recess 54. An aperture 56 extends from the lower circular recess through a base or mounting face 58 of the flange. Together, the recesses and the aperture provide a passage through the flange. It should be noted here that the terms "upper", "lower" and base as applied to the recesses and the flange are used here merely for convenience of description. The inventive pre-ionizer is not limited to being used in the orientation depicted in FIGS. 3-5. Flange 50 is preferably formed from aluminum, but this should not be considered as limiting the present invention.

A crucible 60 is located in lower recess 54 of flange 50. The crucible has a diameter about equal to the diameter of the lower recess. Crucible 60 has a rim portion 63 surrounding a base 62. Base 62 preferably has a thickness less than about 0.10 inches and most preferably less than about 0.05 inches. The crucible base forms a dielectric diaphragm or membrane covering aperture 56 in flange 50 and closing the passage through the flange. A retaining sleeve 64 retains the crucible in the flange by means of screws 68 (only one shown in FIGS. 4 and 5) extending through a flanged portion 66 of the sleeve into the flange in upper recess 52 thereof. A sealing ring 69 (see FIG. 5), preferably of a soft metal such as indium, and located in circular groove 70 in the lower recess of the flange, forms a gas tight seal between the base of the crucible and the flange. Sealing ring 69 is not depicted in FIG. 4 as the scale of the drawing does not permit this to be done with adequate clarity.

Crucible 60 is preferably formed from an alumina ($Al_2O_3$) ceramic. A particularly preferred thickness for the base of a crucible 60 of this material is about 0.020 inches. Other dielectric crucible materials and different base thicknesses may be selected without departing from the spirit and scope of the present invention. A comparison of different dielectric materials and different base (membrane) thicknesses is presented further hereinbelow.

A metal disc (planar) electrode 74 has an integral stem portion 76 thereof extending through bushing 78 of a dielectric material. Aluminum is a suitable metal for electrode 74, the use of other metals, however, is not precluded. One preferred material for bushing 78 is G-10, which is an electronics-industry-standard, fiberglass-epoxy composite material used in PC-board manufacture, and commercially available from several electronic material suppliers. Bushing 78 is supported on a rim portion 63 of crucible 60 via a cushion washer 88 of a material such as stainless steel. A retaining plate 82 of a dielectric material is clamped to the top of flange 50 by screws 84. A preferred dielectric material for plate 82 is also G-10. Stem portion 76 of disc electrode 74 extends through an aperture 85 in plate 82. A spring 86, compressed between plate 82 and bushing 78, provides a force that retains planar electrode 74 in contact with base 62 of crucible 60. The electrode diameter is preferably about equal to or slightly greater than the diameter of aperture 56 in flange 50.

Pre-ionizer 20A is designed to be cooperative with an aperture 27 in a metal wall 25 of laser-gas enclosure 24 of laser 18 of FIGS. 1 and 2. The pre-ionizer is clamped on to wall 25 via screws 90 (only one thereof shown in FIGS. 4 and 5). Aperture 56 of the pre-ionizer flange is aligned in aperture 27 in the enclosure wall. A gas-tight seal between flange 50 and enclosure 24 is provided by a sealing ring 92 compressed in a groove 94 in base 58 of the flange. Flange 50 is in electrical contact with wall 25 of enclosure 24, which is at ground potential. Planar electrode 74 is electrically isolated from the flange.

Pre-ionizer 20A is activated by applying RF power to stem 76 of planar electrode 74. In the configuration, the electrode 74 is the hot or positive electrode and the metal base 54 is connected to ground Power can be supplied by an RF power supply having a relatively low RF frequency for example between about 300 KHz and 400 KHz. The ability to operate at a low RF frequency enables the utilization of low cost RF power transistors cooperative with a low loss ferrite-core, step-up transformer to provide the high RF voltage to the pre-ionizer electrode. In experiments performed to evaluate materials and performance of the inventive pre-ionizer discussed further herein below, a converter-type RF power supply of a semiconductor H-bridge, ferrite-transformer design, using four IRF0210 power transistors was employed. RF output-power of the power supply was about 5 W. Those skilled in the art may choose to use other RF power supply types or RF output-power without departing from the spirit and scope of the present invention.

Continuing with reference in particular to FIG. 4, when RF power is applied to the inventive pre-ionizer a corona discharge 96 is formed adjacent ceramic membrane 62 on the side thereof facing into enclosure 24. Corona discharge 96 provides the desired pre-ionization of laser-gas in enclosure 24. The discharge is a source of ions and also of UV radiation. The UV radiation can provide further pre-ionization. In this arrangement, the rim portion of flange 50 surrounding aperture 56 therein functions as the ground electrode. While this "ground electrode" is not ceramic protected, it is not anticipated that significant erosion will occur. This is because discharge 96 is a relatively low intensity discharge, and the rim of aperture 56 of the flange surrounds only the outer periphery of the discharge. It is believed that erosion can be minimized by plating the rim portion with nickel.

Experiments were performed to evaluate the performance of the inventive pre-ionizer with different ceramic membrane (crucible 60) materials and thicknesses. In these experiments the intensity of light produced by the discharge was observed through an aperture 97 in retaining plate 82, aligned with a hole 98 extending through bushing 78, and a hole 99 extending through electrode 74. As membrane 62 in the experiments was never thicker than 0.040 inches, a significant portion of the light generated in discharge 96 was transmitted by the membrane.

Figure 6:
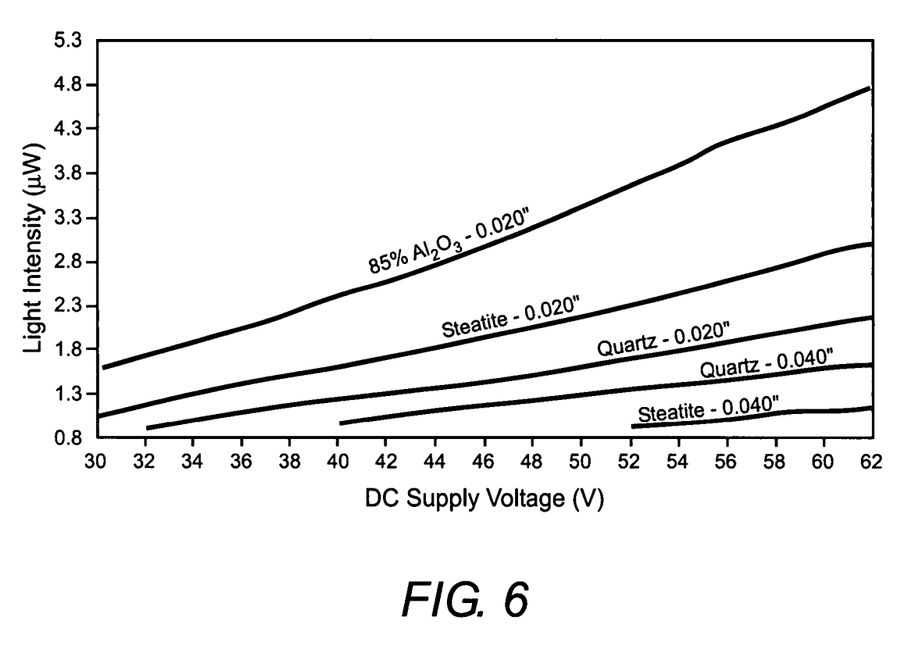
FIG. 6 is a graph schematically illustrating measured light intensity of ionizing discharges produced by examples of the pre-ionizer of FIGS. 3-5 as a function of power supply input voltage for various dielectric materials of the dielectric crucible.
Figure 7:
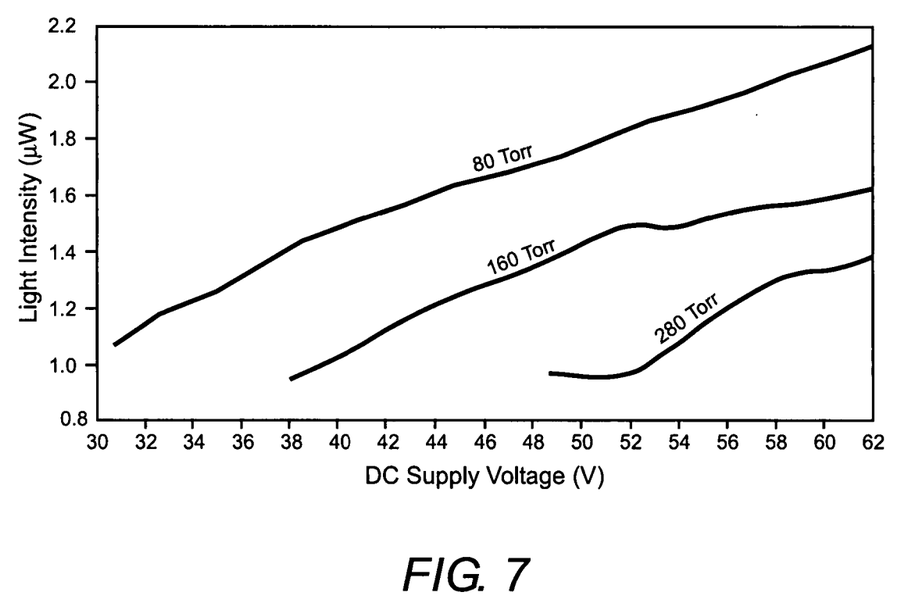
FIG. 7 is a graph schematically illustrating measured light intensity of ionizing discharges produced by an example of the pre-ionizer of FIGS. 3-5 having an alumina crucible as a function of power supply input voltage at various pressures of lasing gas in the laser enclosure.

Results of the experiments are depicted graphically in FIG. 6 and FIG. 7. In these graphs, the X-axis scale is a DC supply voltage, often termed the link-voltage, applied to the H-bridge RF power supply. The RF power output of the power supply (connected to the pre-ionizer) scales essentially directly with this applied DC voltage. In each case, the RF power to the pre-ionizer was at 350 KHz and the laser-gas mixture was 4:1:1 helium (He): nitrogen ($N_2$); $CO_2$ mixture. The unsupported membrane diameter, i.e., the diameter of aperture 56 in flange 50, was 6 millimeters (mm) and the diameter of planar electrode 74 was 7 mm.

FIG. 6 depicts measured light power in microwatts ($\mu W$) as a function of applied link voltage for various membrane materials and different thickness of the membranes. The highest light intensity detected at any applied RF power was obtained with an 85% $Al_2O_3$ ceramic membrane having a thickness of about 0.020 inches. In this experiment the laser gas pressure was 20 Torr. FIG. 7 depicts measured light power in microwatts as a function of applied link voltage for the 85% $Al_2O_3$, 0.020 inches-thick membrane at various laser gas pressures. It can be seen that the discharge intensity is a sensitive function of laser gas pressure at any applied RF power.

FIG. 7 illustrates the amount of pre-ionizing optical radiation emitted from a $CO_2$ laser gas mixture having, for example, 4 parts He: 1 part $CO_2$: 1 part $N_2$ with increasing DC (link) voltage applied to the H-bridge low frequency RF supply for an 85% grade alumina at gas pressures varying from 80 Torr to 280 Torr. As the DC voltage into the H-bridge increases, the output RF power driving the pre-ionizing discharge also increases. As expected, the emitted pre-ionizing optical radiation decreases with increasing gas pressures. Increasing optical radiation indicates increasing pre-ionization. It becomes more difficult to create a discharge with increasing gas pressure.

Optimum placement of the inventive pre-ionizer is between about 0.5 inches and 1.5 inches from the main slab electrodes of the laser (depending on laser gas pressure and other factors) and in clear view of the discharge gap between these electrodes. It was also found that the pre-ionizer was effective when located above a slab electrode, with a hole being provided in the electrode to allow ions and UV radiation from the pre-ionizer discharge to enter the discharge gap between the slab electrodes. Clearly more than one of the inventive pre-ionizers may be provided in a laser.

Figure 8:
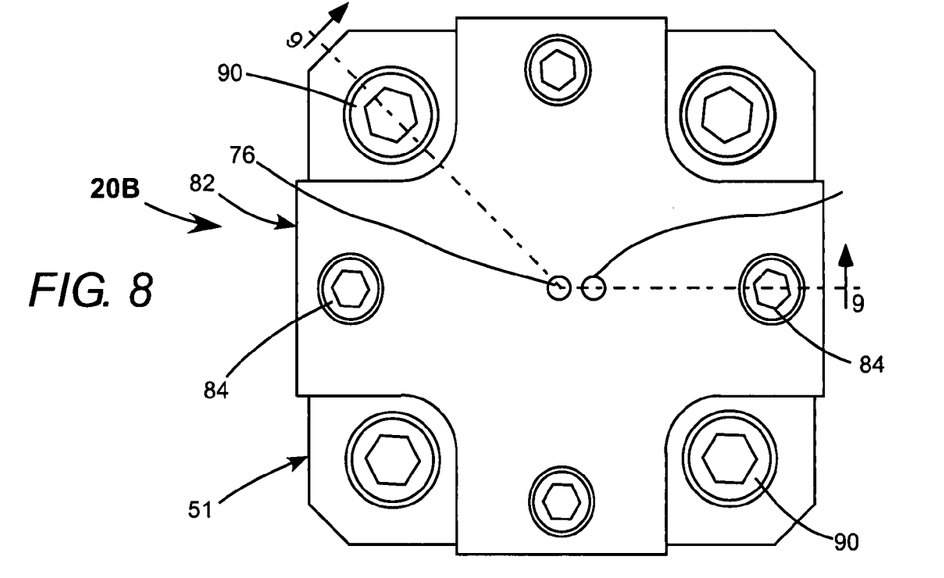
FIG. 8 and FIG. 9, are respectively plan and cross-section views, with FIG. 9 seen generally in the direction 9-9 of FIG. 8, schematically illustrating another preferred embodiment of a pre-ionizer in accordance with the present invention, similar to the pre-ionizer of FIGS. 3 and 4, but wherein the ceramic membrane is a simple disc brazed into the flange and covering the aperture therein.
Figure 9:
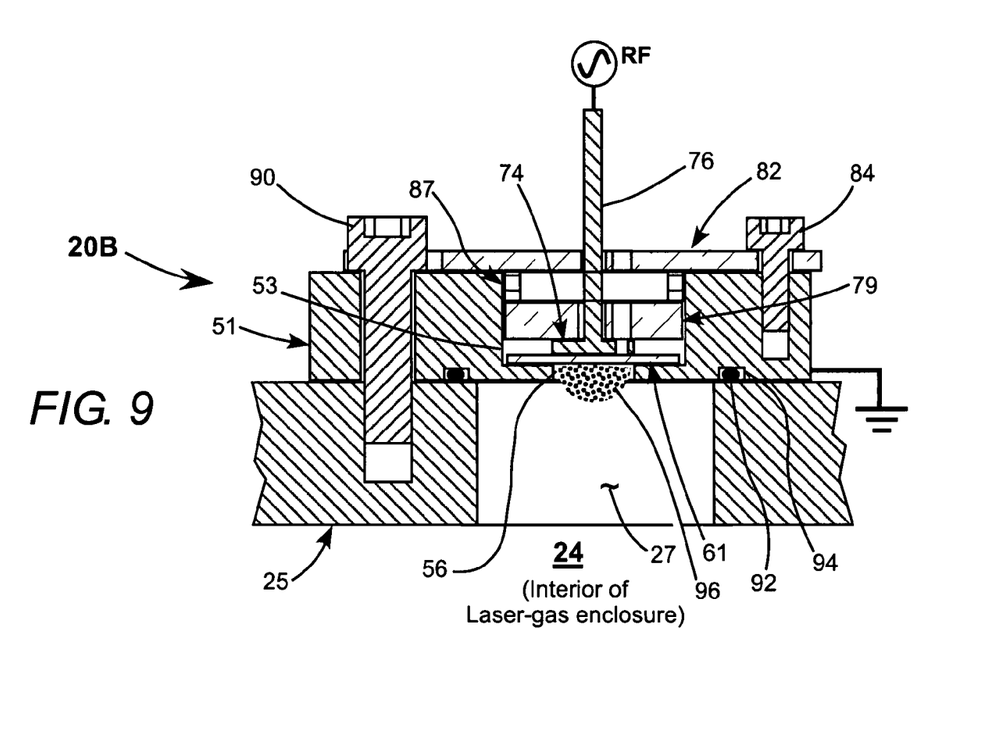
Figure 10:
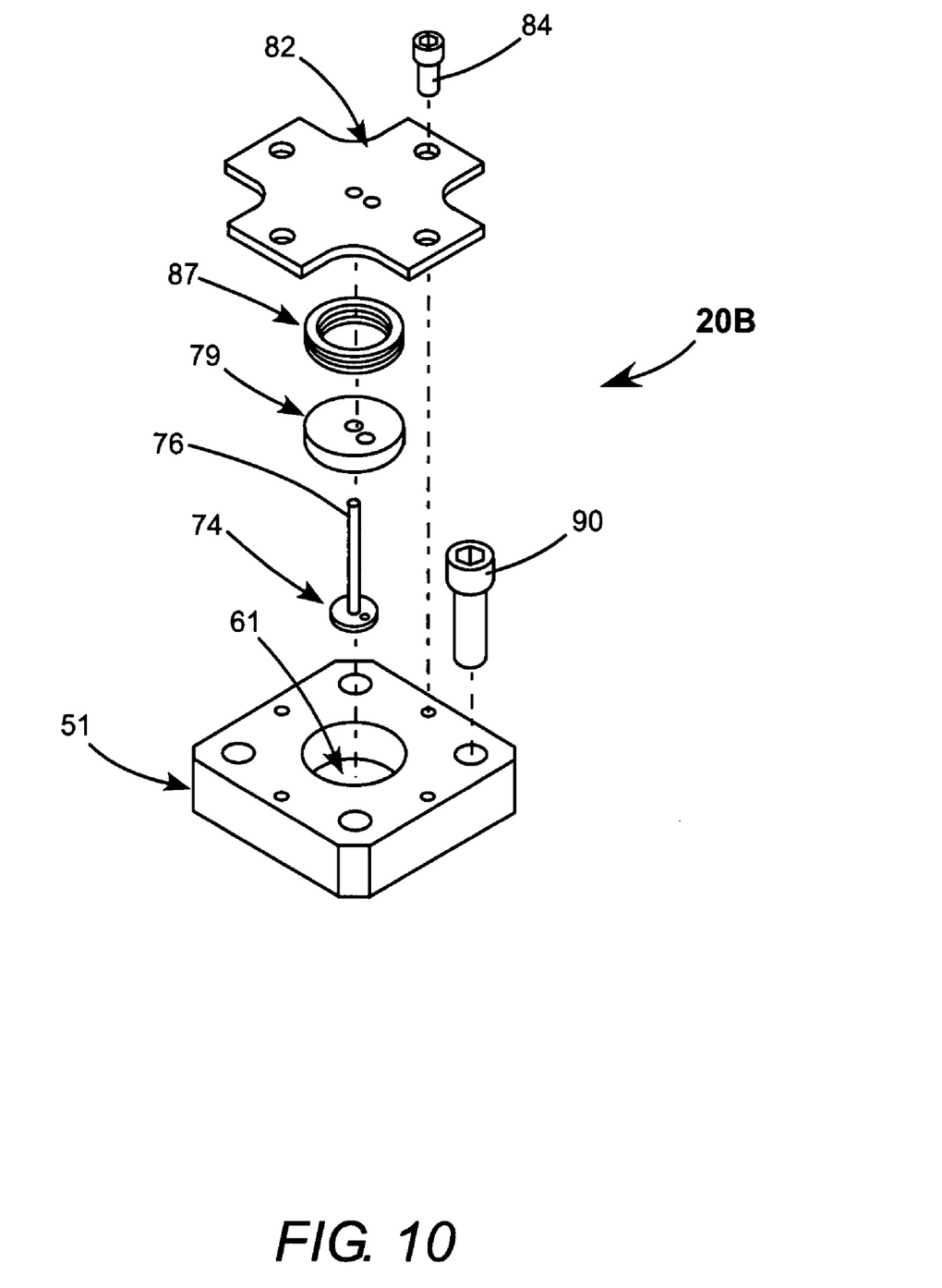
FIG. 10 is an exploded three-dimensional view schematically illustrating further details of components and assembly thereof in the pre-ionizer of FIGS. 8 and 9.

FIG. 8, FIG. 9, and FIG. 10 schematically illustrate another embodiment 20B of a pre-ionizer in accordance with the present invention. Pre-ionizer 20B is similar to pre-ionizer 20A of FIGS. 3-5 but is of simpler construction. Only principal differences between the two embodiments are discussed below.

By way of example, flange 50 of pre-ionizer 20A is replaced in pre-ionizer 20B by a flange 51 that has only one recess 53 therein, with aperture 56 at the base of this recess completing the passage through the flange. Crucible 60 of pre-ionizer 20A is replaced in pre-ionizer 20B by a disc-shaped membrane 61. This disc-shaped membrane is soldered or brazed to flange 51 covering aperture 56 and closing the passage through the flange. This eliminates the need for the crucible-retaining sleeve 64 of pre-ionizer 20A components associated therewith. Electrode 74 is retained in contact with membrane 61 via a spring 87 compressed between a retaining plate 82 and a dielectric bushing 79 that bears on the electrode. It can be seen that pre-ionizer 20B requires only fourteen parts compared with thirty-two parts for pre-ionizer 20A, the part counts, here, including screws. Potentially, then, pre-ionizer 20B can be made at lower cost than pre-ionizer 20A. It should be noted, however, that cost saved in reduced parts, and reduced complexity of parts may be at least partially offset by the cost of a somewhat delicate brazing or soldering operation required to bond ceramic disc 61 to flange 51.

A disadvantage of above-described pre-ionziers 20A and 20B is that discharge 96 can cause sputtering and erosion of metal from around aperture 56 of the pre-ionizer flange. This can limit the lifetime of a laser including any one of the pre-ionizers, in particular by causing a significant drop in lasing gas pressure over a period of about a few hundred hours. This can be avoided by a simple modification of crucible 60 of pre-ionizer 20A.

Figure 11:
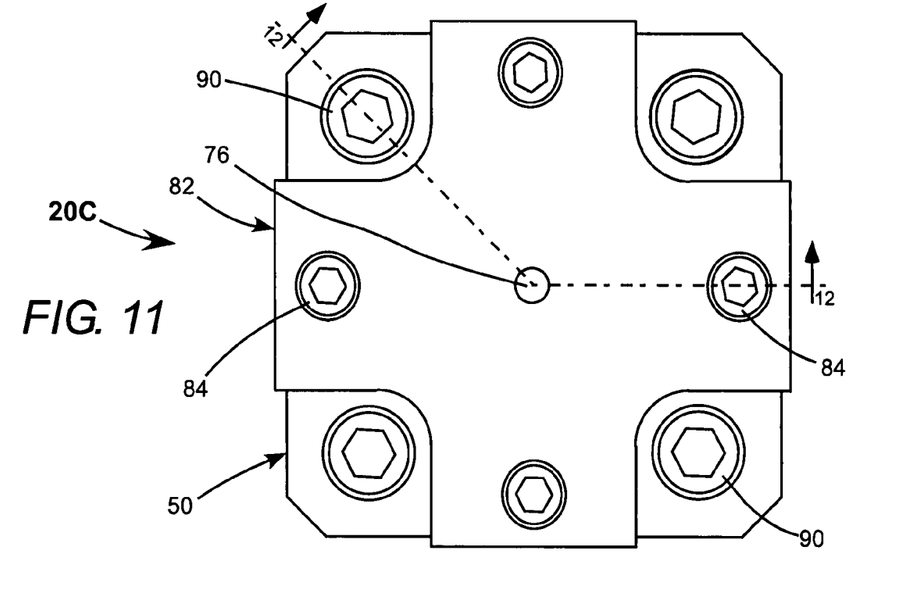
FIG. 11 and FIG. 12, are respectively plan and cross-section views, with FIG. 12 seen generally in the direction 12-12 of FIG. 11, schematically illustrating yet another preferred embodiment of a pre-ionizer in accordance with the present invention, similar to the pre-ionizer of FIGS. 3 and 4, but wherein a cylindrical ceramic sleeve extends from the ceramic membrane through the flange-aperture.
Figure 12:
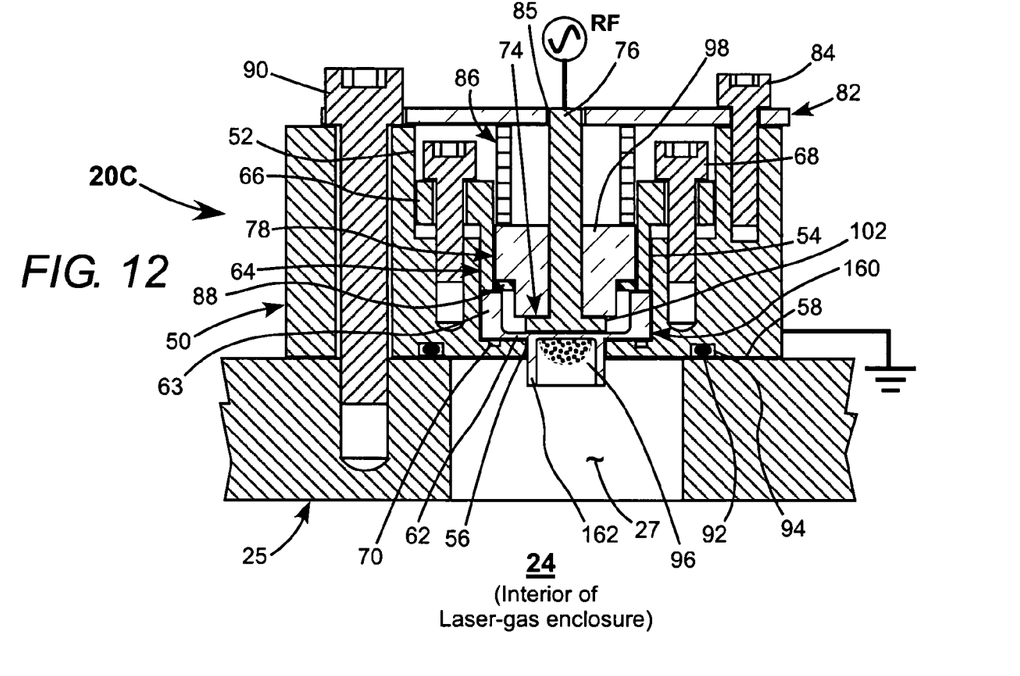

FIG. 11 and FIG. 12, are respectively plan and cross-section views, with FIG. 12 seen generally in the direction 12-12 of FIG. 11, schematically illustrating yet another preferred embodiment 20C of a pre-ionizer in accordance with the present invention, similar to pre-ionizer 20A of FIGS. 3 and 4, but wherein a principle difference is that crucible 60 of pre-ionizer 20A is replaced with a modified crucible 160.

Crucible 160 is similar to crucible 60 but includes a cylindrical ceramic sleeve 162 integral with the crucible, and extending from base (membrane) portion 62 of the crucible through aperture 56 of the pre-ionizer flange. The length of sleeve 162 is selected such that discharge 96 is contained within the sleeve and does not make contact with any portion of the flange, thereby eliminating the sputtering and erosion that can limit the lifetime of examples of pre-ionizers 20A and 20B. The length of the sleeve is selected according to the diameter of planar portion 102 of electrode 74 and the applied voltage. The wall thickness of the sleeve is comparable with the thickness of base (membrane) portion 62. By way of example, for an electrode diameter of 8.0 millimeters (mm) and an applied voltage of 2.8 kilovolts (kV) peak-to-peak, a suitable sleeve length is about 5.5 mm, a suitable wall thickness is about 0.75 mm and a suitable diameter is about 7.0 mm.

In addition to the modified ceramic crucible of pre-ionizer 20C there are other minor mechanical differences between pre-ionizer 20A and pre-ionizer 20C that have no significant impact on the electrical function of pre-ionizer 20C. These include omission of provisions for observing the discharge through bushing 78, and provision of a larger diameter stem 76 for electrode 74.

It has been found that in a pre-ionizer 20C a higher RF voltage is required to strike discharge 96 than is required in another wise comparable pre-ionizer 20A. By way of example, in one example of a pre-ionizer 20A, a pulsed RF voltage of about 1.8 kV peak-to-peak was required to sustain discharge 96 in a 4:1:1 ($He:CO_2:N_2$) gas mixture at a pressure of 120 Torr. In a comparable example of a pre-ionizer 20C, with the same gas mixture, at the same pressure, an RF voltage of about 2.8 kV peak-to-peak was required to sustain a discharge.

Regarding extending laser lifetime, in a laser including one example of a pre-ionizer 20A having a nickel body, an 94% alumina crucible and a gas mixture of 4:1:1 ($He:CO_2:N_2$) initially at a pressure of 120 Torr, gas pressure began to fall significantly after about 900 Hours and fell to about 45% of the initial value over a subsequent 600 Hours. In the same laser at the same initial pressure, including an example of pre-ionizer 20C, no significant pressure drop was observed after 3500 Hours of operation.

In summary, the present invention is described above in terms of two preferred embodiments. The invention is not limited, however, to the embodiments described and depicted. Rather, the invention is limited only by the claims appended hereto.

What is claimed is:

1. A pre-ionizer for a gas-discharge laser, comprising:
   a metal body attachable to the gas-discharge laser and having a passage extending therethrough;
   a membrane of a dielectric material sealably retained within the metal body and closing one end of the passage through the metal body;
   a planar electrode retained within the metal body, in contact with the dielectric membrane on one side thereof and electrically isolated from the metal body such that when the pre-ionizer is attached to the gas discharge laser via the metal body and an RF potential is applied across the planar electrode and the metal body, a gas discharge is formed in the passage on the side of the dielectric membrane opposite the electrode; and
   a dielectric sleeve extending from the dielectric membrane on the side thereof opposite the planar electrode and extending within said passage and configured to prevent the gas discharge from contacting the inner surface of the passage.

2. The pre-ionizer of claim 1, wherein the dielectric sleeve is a cylindrical sleeve and is integral with the dielectric membrane.

3. The pre-ionizer of claim 1, wherein the passage through the metal body has, in sequence of position, a first portion having a first diameter, a second portion having a second diameter less than the first diameter, and a third portion having a third diameter less than the second diameter, wherein the dielectric membrane is a base portion of a circular dielectric crucible including a raised rim portion having a diameter greater than the third diameter such that the crucible covers the third portion of the passage and the dielectric sleeve is cylindrical and is an integral portion of the crucible.

4. The pre-ionizer of claim 3, wherein the crucible is retained in the second portion of the aperture though the metal body by a cylindrical retaining sleeve bearing on the rim portion of the crucible, the retaining sleeve including a flanged portion having a diameter greater than the second diameter, and wherein and the retaining sleeve is attached to the metal body by screws extending through the flanged portion of the retaining sleeve into a base portion of the first portion of the passage through the metal body.

5. The pre-ionizer of claim 4, wherein the sealable retention of the dielectric membrane in the metal body is provided by a compressible sealing ring located between the rim portion of the dielectric crucible and the base of the second portion of the passage extending through the metal body.

6. The pre-ionizer of claim 5, wherein the sealing ring is a ring of a soft metal.

7. The pre-ionizer of claim 6, wherein the soft metal is indium.

8. The pre-ionizer of claim 3, wherein the planar electrode is a disc shaped electrode having a stem portion extending therefrom for making electrical contact to the electrode, the stem portion of the electrode extending through a dielectric bushing and through a dielectric retaining plate attached to the metal body and covering the first portion of the passage extending therethrough, and wherein the electrode is maintained in contact with the dielectric membrane by a spring compressed between the dielectric bushing and the dielectric retaining plate.

9. The pre-ionizer of claim 8, wherein at least one of the dielectric bushing, the dielectric retaining plate, and the dielectric membrane provide the electrical isolation of the electrode from the metal body.

10. A gas discharge laser comprising:
    a pair of spaced apart planar electrodes;
    an enclosure in which said electrodes and a lasing gas are located, said enclosure including an aperture adjacent to one of the electrodes;
    a preionizer including:
    a metal base having a passage aligned with the aperture in the enclosure;
    a thin ceramic member mounted within the metal base and covering one end of the passage;
    a preionizer electrode having a planar surface biased into contact with the ceramic member;
    an RF power supply for energizing the electrodes and the preionizer wherein in use, the preionizer is energized to create ions in the gas in the region of the passage and thereafter the electrodes are energized to excite the lasing gas and create a discharge between the electrodes; and
    a dielectric sleeve extending from the ceramic member on the side thereof opposite the planar surface of the preionizer electrode and extending within said passage.

11. The laser of claim 10, wherein the dielectric sleeve is a cylindrical sleeve and is integral with the ceramic member.

12. The laser of claim 10, wherein said ceramic member is defined as the base of a crucible mounted within said metal base.

13. The laser of claim 10, wherein said electrode includes a stem electrically isolated from the metal base and connected to the positive output from the RF power supply and with the metal base being connected to ground.

14. A pre-ionizer for a gas-discharge laser, comprising:
a metal body attachable to the gas-discharge laser and having a passage extending therethrough;
a membrane of a dielectric material sealably retained within the metal body and closing the passage through the metal body;
a planar electrode retained within the metal body, in contact with the dielectric membrane on one side thereof and electrically isolated from the metal body such that when the pre-ionizer is attached to the gas discharge laser via the metal body and an RF potential is applied to the planar electrode a gas discharge is formed on the side of the dielectric membrane opposite the electrode; and
a dielectric sleeve extending from the dielectric membrane on the side thereof opposite the planar electrode and configured to prevent the gas discharge from contacting the metal body and wherein the passage through the metal body has, in sequence of position, a first portion having a first diameter, a second portion having a second diameter less than the first diameter, and a third portion having a third diameter less than the second diameter, wherein the dielectric membrane is a base portion of a circular dielectric crucible including a raised rim portion having a diameter greater than the third diameter such that the crucible covers the third portion of the passage and the dielectric sleeve is cylindrical and is an integral portion of the crucible.

15. The pre-ionizer of claim 14, wherein the dielectric sleeve is a cylindrical sleeve and is integral with the dielectric membrane.

16. The pre-ionizer of claim 14, wherein the crucible is retained in the second portion of the aperture though the metal body by a cylindrical retaining sleeve bearing on the rim portion of the crucible, the retaining sleeve including a flanged portion having a diameter greater than the second diameter, and wherein and the retaining sleeve is attached to the metal body by screws extending through the flanged portion of the retaining sleeve into a base portion of the first portion of the passage through the metal body.

17. The pre-ionizer of claim 16, wherein the sealable retention of the dielectric membrane in the metal body is provided by a compressible sealing ring located between the rim portion of the dielectric crucible and the base of the second portion of the passage extending through the metal body.

18. The pre-ionizer of claim 17, wherein the sealing ring is a ring of a soft metal.

19. The pre-ionizer of claim 18, wherein the soft metal is indium.

20. The pre-ionizer of claim 14, wherein the planar electrode is a disc shaped electrode having a stem portion extending therefrom for making electrical contact to the electrode, the stem portion of the electrode extending through a dielectric bushing and through a dielectric retaining plate attached to the metal body and covering the first portion of the passage extending therethrough, and wherein the electrode is maintained in contact with the dielectric membrane by a spring compressed between the dielectric bushing and the dielectric retaining plate.

* * * * *